United States Patent
Fried

(10) Patent No.: US 7,860,932 B2
(45) Date of Patent: Dec. 28, 2010

(54) METHOD AND SYSTEM FOR TEMPORAL DELIVERY OF EMAIL MESSAGES

(76) Inventor: Asaf Fried, 15-01 132 St., College Point, NY (US) 11356

( * ) Notice: Subject to any disclaimer, the term of this patent is extended or adjusted under 35 U.S.C. 154(b) by 940 days.

(21) Appl. No.: 11/263,635

(22) Filed: Oct. 31, 2005

(65) Prior Publication Data
US 2006/0223554 A1 Oct. 5, 2006

Related U.S. Application Data

(60) Provisional application No. 60/668,435, filed on Apr. 4, 2005.

(51) Int. Cl.
*G06F 15/16* (2006.01)
(52) U.S. Cl. ...................................... 709/206
(58) Field of Classification Search ............... 709/206
See application file for complete search history.

(56) References Cited

U.S. PATENT DOCUMENTS

| | | | |
|---|---|---|---|
| 5,995,596 A * | 11/1999 | Shaffer et al. | 379/88.18 |
| 6,044,275 A | 3/2000 | Boltz et al. | |
| 6,108,688 A | 8/2000 | Nielsen | |
| 6,175,859 B1 | 1/2001 | Mohler | |
| 6,185,603 B1 * | 2/2001 | Henderson et al. | 709/206 |
| 6,212,268 B1 | 4/2001 | Nielsen | |
| 6,721,784 B1 | 4/2004 | Leonard et al. | |
| 6,732,185 B1 | 5/2004 | Reistad | |
| 6,854,007 B1 | 2/2005 | Hammond | |
| 2001/0034769 A1 * | 10/2001 | Rast | 709/206 |
| 2001/0054077 A1 | 12/2001 | Usami | |
| 2003/0018724 A1 | 1/2003 | Mathewson, II et al. | |
| 2003/0131060 A1 | 7/2003 | Hartselle et al. | |
| 2003/0222765 A1 | 12/2003 | Curbow et al. | |
| 2003/0229668 A1 | 12/2003 | Malik | |
| 2003/0229673 A1 | 12/2003 | Malik | |
| 2004/0008830 A1 | 1/2004 | Okamura | |
| 2004/0122900 A1 | 6/2004 | Pous et al. | |
| 2005/0027676 A1 | 2/2005 | Eichstaedt et al. | |
| 2005/0033845 A1 | 2/2005 | Perepa et al. | |
| 2005/0108343 A1 * | 5/2005 | Collet et al. | 709/206 |
| 2006/0036695 A1 * | 2/2006 | Rolnik | 709/206 |

FOREIGN PATENT DOCUMENTS

| | | |
|---|---|---|
| JP | 2000324158 | 11/2000 |
| JP | 2001337896 | 12/2001 |
| JP | 2003228541 | 8/2003 |
| JP | 2004046562 | 2/2004 |
| JP | 2004048625 | 2/2004 |

* cited by examiner

*Primary Examiner*—Larry Donaghue
(74) *Attorney, Agent, or Firm*—Knobbe Martens Olson & Bear LLP

(57) ABSTRACT

One embodiment includes an exemplary method of providing temporal control of email delivery. The method further includes receiving message data comprising at least a message body and a selected time. The message further includes displaying a first portion of the message data prior to the selected time. The first portion excludes at least a portion of the message body. The method further includes displaying a second portion of the message data after the selected time. The second portion of the message data includes the excluded portion of the message body. Other embodiments include systems for performing the method and applications of the method.

25 Claims, 7 Drawing Sheets

Parked Inbox

View: All Messages ▼

[Delete] [Spam] [Mark ▼] [Move... ▼]

Messages 201-309 of 309    First | Previous | Next | Las

19% of 250.0MB

| | Sender | Subject | Park Date | Park Time | Send Date | Size |
|---|---|---|---|---|---|---|
| ☐ | ImageLinkUSA | [ ImageLinkUSA ] Important Security Announce | Fri 12/24 | 12:34 (GMT+2) | Fri 12/24 | 3k |
| ☐ | xmsignal@xm-radio.com | XM Signal - Your Guide to XM On and Off th | Thu 12/23 | 12:34 (GMT+2) | Thu 12/23 | 53k |
| ☐ | xmsignal@xm-radio.com | The Complete Elton John on XM | Tue 12/21 | 12:34 (GMT+2) | Tue 12/21 | 6k |
| ☐ | Kathleen McKormick | Phonecard Order Confirmation from Union Telec | Fri 12/17 | 12:34 (GMT+2) | Fri 12/17 | 4k |
| ☐ | orders@fasigs.com | Fasigs Coffee Order | Wed 12/15 | 12:34 (GMT+2) | Wed 12/15 | 2k |
| ☐ | support@xdrive.com | Xdrive Subscription Cancellation | Mon 12/06 | 12:34 (GMT+2) | Mon 12/06 | 2k |
| ☐ | Providian | You have earned an upgrade from Providian. | Fri 11/12 | 12:34 (GMT+2) | Fri 11/12 | 18k |
| ☐ | Motorola Mailbox | The unit stopped working, aperantly due to a pro | Wed 11/10 | 12:34 (GMT+2) | Wed 11/10 | 12k |
| ☐ | watchnotice@ebay.com | eBay Watched item ending soon! - MoToRoLa v S9563 S9563... | Tue 11/09 | 12:34 (GMT+2) | Tue 11/09 | 23k |
| ☐ | Gabi | 📎 Your contact info | Sun 11/07 | 12:34 (GMT+2) | Sun 11/07 | 17k |
| ☐ | support@sonyconnect.com | Primary Card Charge | Sat 11/06 | 12:34 (GMT+2) | Sat 11/06 | 4k |
| ☐ | 📎 Asaf | RE: 11-03-2004 | Thu 11/04 | 12:34 (GMT+2) | Thu 11/04 | 14k |

Figure 6

METHOD AND SYSTEM FOR TEMPORAL DELIVERY OF EMAIL MESSAGES

RELATED APPLICATIONS

This application claims the benefit of, and incorporates by reference in its entirety, U.S. Provisional Application No. 60/668,435, filed on Apr. 4, 2005.

BACKGROUND OF THE INVENTION

1. Field of the Invention

The present invention relates to email systems and related methods.

2. Description of the Related Technology

The accessibility, flexibility, and affordability of electronic messaging services such as email make them an increasingly important part of business and personal life. Email generally provides a cheap and flexible mechanism for sending a variety of different types of communications such as greeting cards, legal communications and notifications, advertising, etc. It is also increasingly used for conducting business by financial institutions and government organizations. However, existing email systems lack sufficient control over timing aspects of email for certain applications. Thus, a need exists for improved email systems.

SUMMARY OF CERTAIN INVENTIVE ASPECTS

The systems, methods, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages that include a convenient and reliable way of controlling the temporal attributes of email messages.

One embodiment includes an exemplary method of providing temporal control of electronic message delivery and message availability. The method further includes receiving message data comprising at least a message body and a selected time. The message further includes providing for display a first portion of the message data prior to the selected time. The first portion excludes at least a portion of the message body. The method further includes providing for display a second portion of the message data after the selected time. The second portion of the message data includes the excluded portion of the message body. The specified time may include one or both of a time and a date.

Another embodiment includes a system for providing temporal control of electronic message delivery. The system includes a storage configured to store message data related to a message. The message data includes at least a message body and a selected time. The system further includes at least one processor configured to store the message data to the storage. The processor is further configured to, prior to the selected time, provide a first portion of the message data. The first portion excludes at least a portion of the message body. The processor is further configured to, after the selected time, provide a second portion of the message data. The second portion of the message data includes the excluded portion of the message body.

Another embodiment includes a system for providing temporal control of electronic message delivery. The system includes means for storing message data related to a message. The message data includes at least a message body and a selected time. The system further includes means for providing for display a first portion of the message data prior to the selected time. The first portion excludes at least a portion of the message body. The system further includes means for providing for display a second portion of the message data after the selected time. The second portion of the message data includes the excluded portion of the message body.

BRIEF DESCRIPTION OF THE DRAWINGS

FIG. 6 is a screenshot of an exemplary user interface for viewing email messages such as processed by the method of FIG. 4.

DETAILED DESCRIPTION OF CERTAIN EMBODIMENTS

Figure 1:
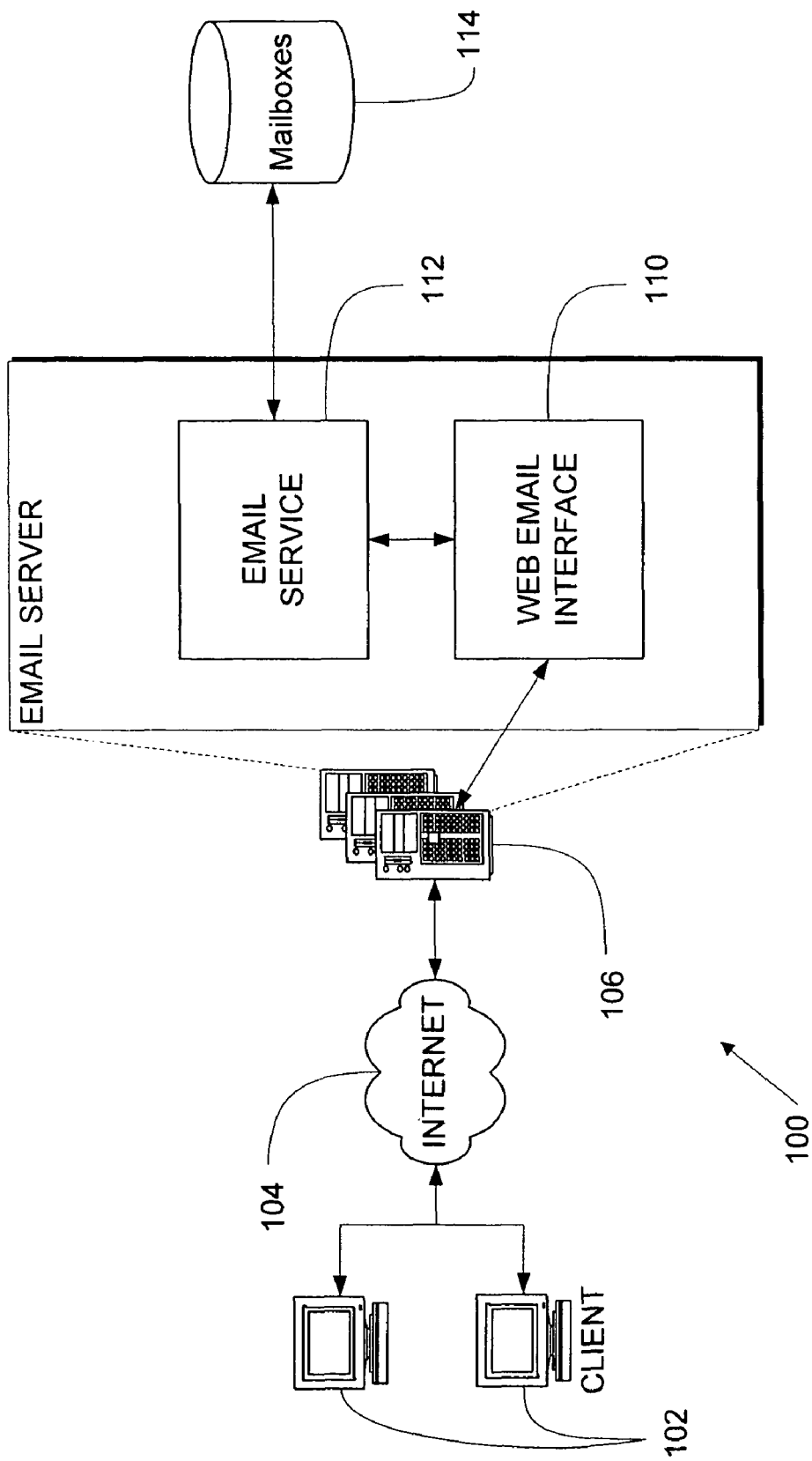
FIG. 1 is a block diagram illustrating one embodiment of an email system that provides temporal control of email availability.

The following detailed description is directed to certain specific embodiments of the invention. However, the invention can be embodied in a multitude of different ways as defined and covered by the claims. In this description, reference is made to the drawings wherein like parts are designated with like numerals throughout.

A number of potential applications for email require relatively precise controls on the timing and availability of email messages. In one simple example, a person wishes to send a birthday greeting that will arrive at a specified time on the recipient's birthday. The sender could send the message at the desired time, but this requires the sender to be available at that time. Further, intermittent network or computer problems may interfere with such last minute timely delivery of information.

Thus, one embodiment is an email system that delivers a message to a mailbox of a recipient at, but no sooner than, a particular time regardless of when the message was sent. This allows the sender to ensure delivery of a message that is needed, due, or appropriate at a particular time without allowing the recipient to view the contents of the message before the required time. Further, metadata such as the sender, the time the message was sent, or the subject of the message may be provided to the recipient before the specified time, without permitting the actual content of the body of the message to be viewed by the recipient. The full content and message body of the message may then be viewed by the recipient at, or after, the specified time.

Prior to the specified delivery time, the message may be referred to as a "parked message" and may be stored in a specialized mailbox that parallels a mailbox of the recipient. This specialized mailbox may be referred to as a "parked mailbox." Only metadata associated with the message, such as the sender, the time the message was sent, a subject, or a delivery time may be viewed when the message is in the parked mailbox. In particular, the body or content of the message is excluded from the viewable data when parked. After the specified time, the message is moved from the parked mailbox to the corresponding mailbox of the recipient. For example, if the recipient has mailboxes identified as "Inbox," and "Bulk," parked email directed to that recipient would be stored in corresponding folders "Parked Inbox" and "Parked bulk mail." Such parallel mailboxes allow the recipient to quickly identify which messages are not yet available for full viewing, while confirming that they have been received. In one embodiment, a specified time, or park time, of a message includes both a time of day and a date, although it may include only one or the other. In one embodiment, the specified time is stored in universal time that represents both a time and date and displayed based on a viewer's time zone setting.

In one embodiment, the sender of a parked message may specify that the message is to be stored in a mailbox owned or associated with the sender. In such a case, the message may be stored in a parked mailbox such as "Parked Outbox" rather than "Parked Inbox."

FIG. 1 is a block diagram illustrating one embodiment of a system 100 that provides temporal control of email availability. The system 100 includes one or more clients 102 in communication via a network 104 with one or more email servers 106. Each of the clients 102 includes a computer system, such as a personal computer system, or any other electronic device, such as a mobile telephone or personal digital assistant, that can execute a web browser, including commercially available web browsers. The network 104 may be any suitable type of data communications network, including Internet Protocol networks. In one embodiment, at least a portion of the network is the Internet.

A "system" is comprised of various modules as discussed in detail herein. As can be appreciated by one of ordinary skill in the art, each of the modules may comprise various sub-routines, procedures, definitional statements, and macros. In various embodiments, each of the modules may be separately compiled and linked into a single or multiple executable programs. The description of each of the modules is thus used for convenience to describe the functionality of certain embodiments of the system. Thus, the processes that are undergone by each of the modules may be arbitrarily redistributed to one of the other modules, combined together in a single module, or made available in, for example, a shareable dynamic link library.

An email server 106 may include any suitable type of server computer system, including commercially available server computer systems. In one embodiment, the server 106 includes one or more processors, a memory, and an interface to the network 104. In one embodiment, the email server 106 comprises one or more computers that are configured to perform the functions described herein. In one embodiment, the functionality described herein with respect to the email server 106 is partitioned or divided between a group or cluster of computer systems. The exemplary email server 106 includes one or more modules such as a web email interface 110 and an email service 112. The email service 112 may store and retrieve mailbox data and email messages to and from one or more mailboxes 114. The web email interface 110 includes web server software that provides content, e.g., hypertext markup language (HTML) documents, that provide a user interface to the email service 112 via web browser software of the client 102. In one embodiment, the web email interface 110 dynamically generates HTML that provides user interfaces for sending email, managing mailboxes, viewing lists of email messages in mailboxes, viewing header data or metadata associated with a message, and viewing email messages. In one embodiment, the mailboxes 114 include a disk drive or other suitable storage device for storing email messages and mailboxes.

The email service 112 may include software for sending, receiving, and storing email. In one embodiment, the email service 112 includes software for managing email according to well known Internet protocols such as simple email transport protocol (SMTP) for sending messages, post office protocol, version 3 (POP3) for retrieving messages, internet message access protocol (IMAP) for viewing, storing, and retrieving email. Portions of the email service 112 may comprise commercially available email service software.

In operation, email messages are sent by the client 102, via the network 104, to the email server 106. In one embodiment, the messages are received by the web email interface 110 which provides the messages to the email service 112. The email service 112 identifies the recipient of the message and stores the message to a mailbox 114 of the recipient. The email messages may generally include any type of content and/or attachment, including text or multimedia content such as images, audio, or video data.

In another embodiment, the system 100 includes email software that is not web-based. For example, the clients 102 may communicate with the email service 112 directly. In one such embodiment, the client 102 includes email client software instead of, or in addition to, the web browser. The email client software on the client 102 periodically retrieves email messages from the email service 112 and stores the retrieved messages to mailboxes located on a local memory or disk drive. The client email software may also provide a user interface for viewing such mailboxes. In one such embodiment, only the header information related to parked messages is available to local client software. In such embodiments, the viewing of parked messages may be limited so that the full content of parked messages is not available to the client until the client software retrieves messages after the expiration of the park time. In one embodiment, the client software 102 is configured to automatically download the remaining content of the parked message at the expiration of the park time.

Figure 2:
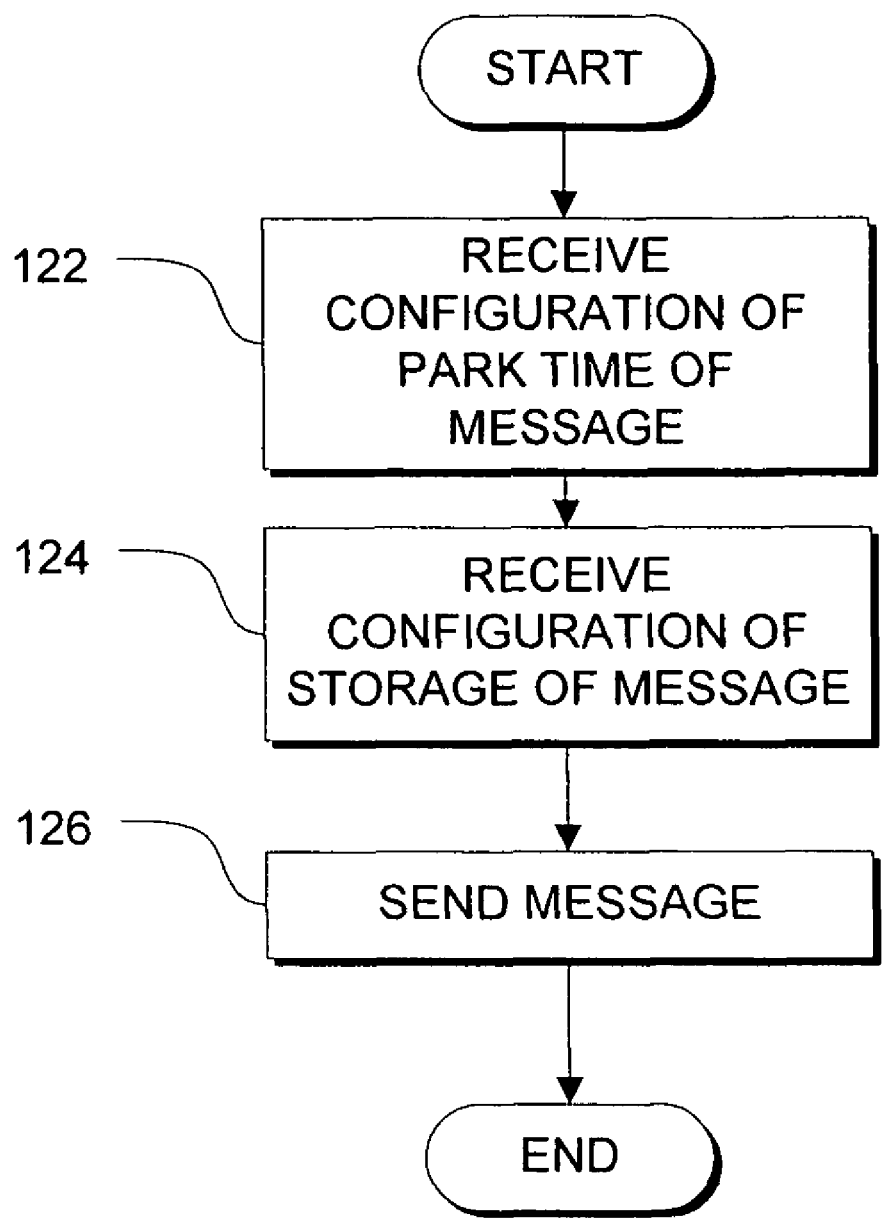
FIG. 2 is a flowchart illustrating an exemplary method of sending email using an email system such as depicted in FIG. 1.

FIG. 2 is a flowchart illustrating an exemplary method of sending a parked email message using the email system 100 of FIG. 1. The method begins at a block 122 where the web email interface 110 receives an activation time (park time) for the message from the user. In one embodiment, the user provides the information via a web page (see FIG. 3) provided by the web email interface 110. In one embodiment, the park time is a date and time specified with respect to Greenwich Mean Time (GMT), e.g., as a time and an offset from GMT, at which the email message is to be activated, e.g., or made available to the recipient. In another embodiment, the park time may be specified as a time period extending from the time the message is sent. Next at block 124, the web email interface 110 receives information about ownership of the message. "Ownership" as used herein refers to the party for whom the storage space of the message is associated or allocated. In one embodiment, the message is stored in a mailbox associated with an owner of the message, either the sender or the recipient. In one embodiment, the user provides the information via a web page provided by the web email interface. In one embodiment, the message may be configured to be stored, or "owned," by the "sender" or by the "recipient." When "sender" is selected, the email service 112 stores the message in a parked mailbox associated with the sender, e.g., a "Parked Outbox" of the sender. When "recipient" is selected, the email service 112 stores the message in a parked mailbox associated with the receiver, e.g., a "Parked Inbox."

Next at block 126, the web email interface 110 receives the email message from the user and sends the email message via the email service 112. In one embodiment, the web email interface 112 stores the park time and ownership of the email message as metadata in one or more email header fields. In one embodiment, the email service 112 identifies parked messages based on the metadata in the header fields. Parked email messages may comply with well known Internet email protocols. In addition, parked messages may incorporate other typical email features such as attachments, carbon copy ("cc"), distribution lists, etc.

Figure 3:
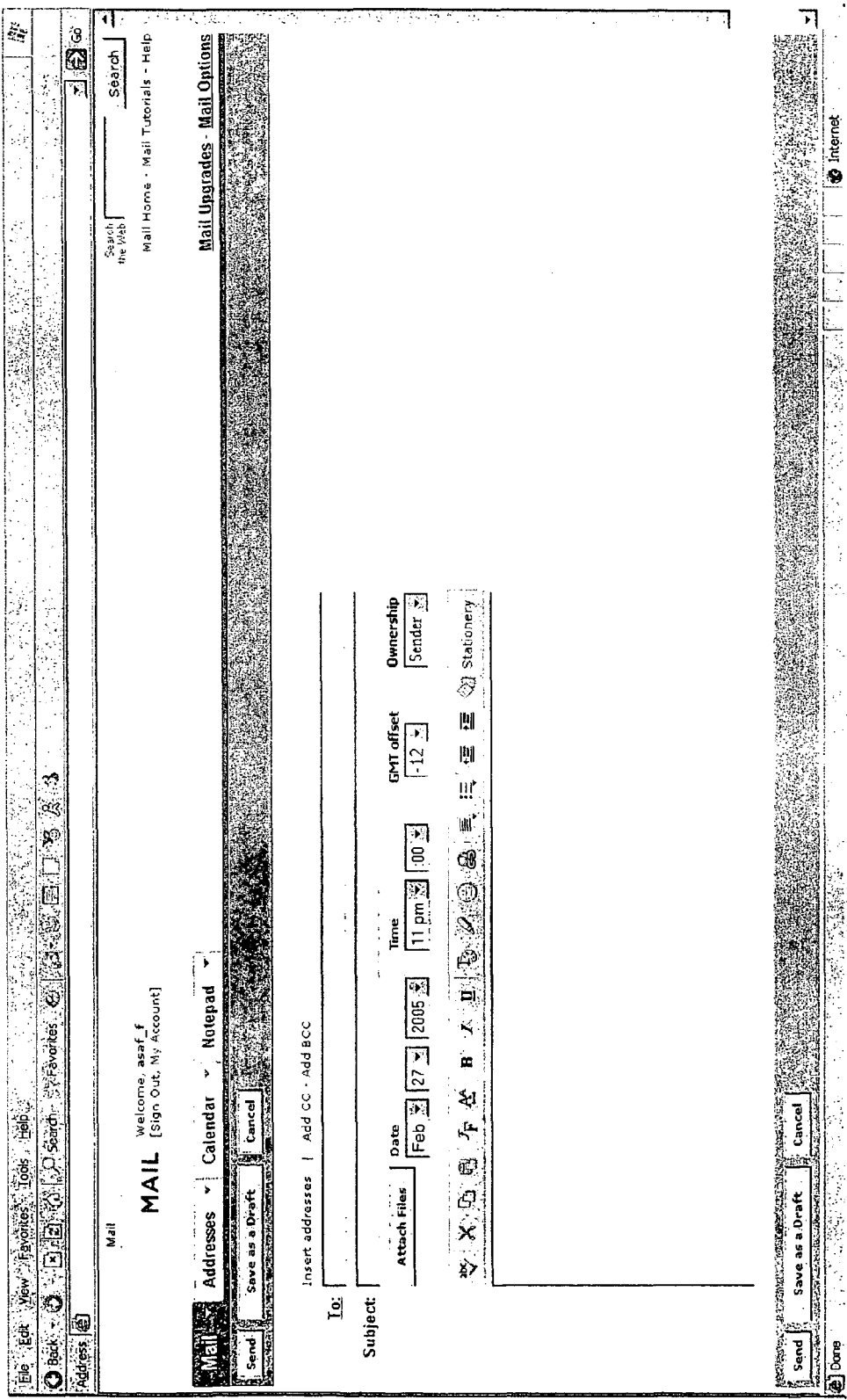
FIG. 3 is a screenshot of an exemplary user interface for sending an email using an email system such as depicted in FIG. 1.

FIG. 3 is a screenshot of an exemplary user interface for sending an email using the email system 100. As illustrated, the user interface includes fields for entering standard email information such as the recipient (the "to:" field), the subject, and the body of the message. The interface also includes fields and mouse-activated controls to set the park time (e.g., the Date, Time, and GMT Offset) and ownership of the parked message. The interface may also provide basic email controls such as "Send," "Save as a Draft," "spell checking," etc. which are illustrated as mouse-activated buttons. In one embodiment, the web email interface 110 generates web pages that include a page such as the exemplary page illustrated in FIG. 3.

Figure 4:
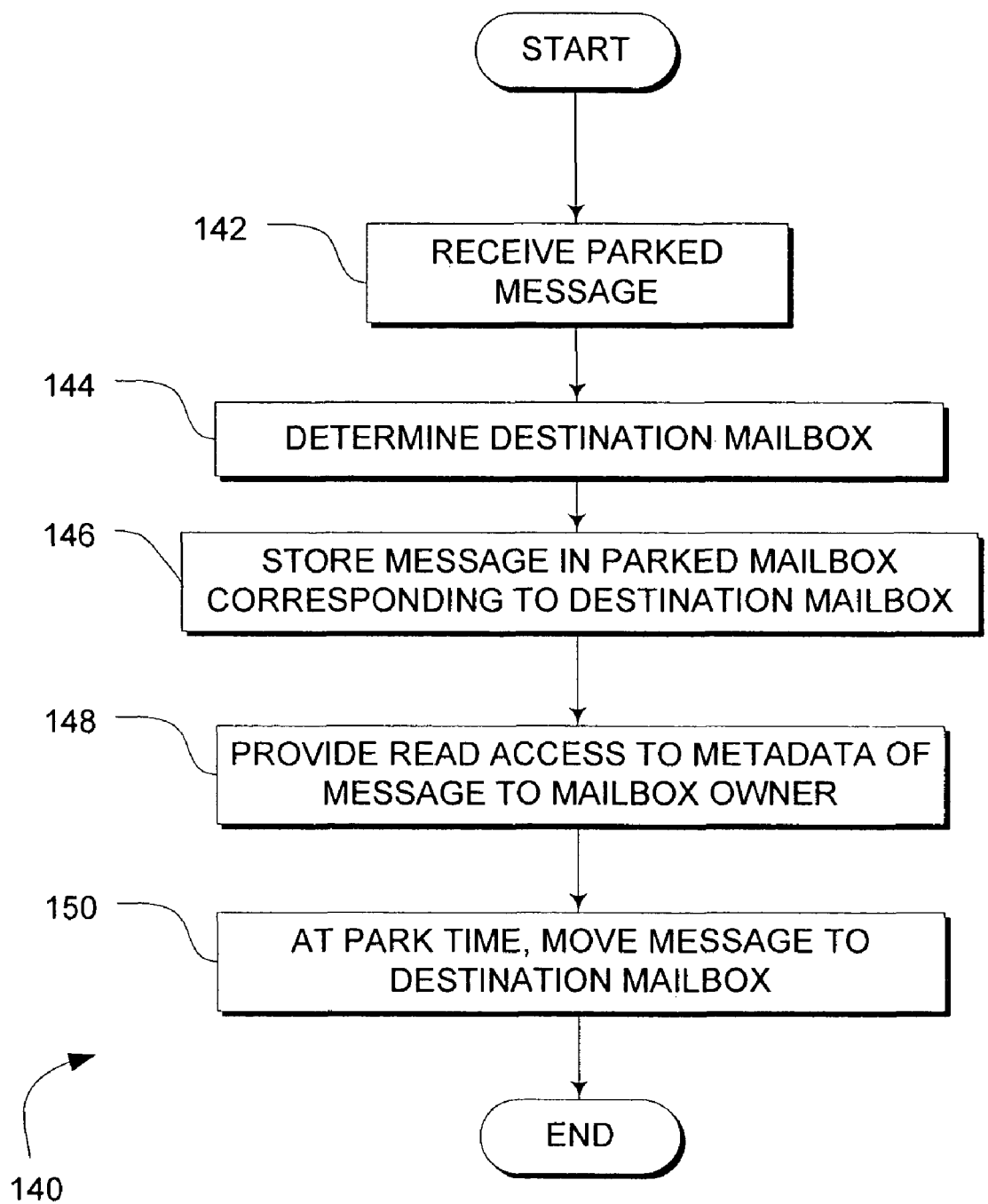
FIG. 4 is a flowchart illustrating an exemplary method of processing an email using an email system such as depicted in FIG. 1.

FIG. 4 is a flowchart illustrating an exemplary method 140 of processing a parked email message using the system 100. The method 140 begins at a block 142 in which the email service 112 receives a parked message. Next at a block 144, the email service 112 determines the destination mailbox for the message. Moving to a block 146, the email service 112 stores the parked message to a corresponding parked mailbox. For example, if the message is to be sent to the inbox of the recipient (i.e., the destination mailbox) after the park time expires, the email service 112 may store the message in an associated parked mailbox of the recipient that parallels the intended destination mailbox for the message. The names or identifiers used herein to refer to mailboxes are merely exemplary. In certain embodiments, parked messages may be stored in a mailbox named automatically by the email service 112. In one embodiment, if the message storage is specified as "sender," the email service 112 may store the parked message to a "Parked Outbox" associated with the sender of the message. Moreover, parked email messages may be processed by filters used for other email, such as for virus control or for assigning messages to particular mailboxes. For example, a filter may assign a parked message to a bulk mailbox, e.g., stored in a "Parked Bulk Inbox" of the recipient.

Proceeding to a block 148, the email service 112 provides read-only access to the owner of the parked mailbox of parked message metadata such as one or more of the sender, subject, receipt time, or park time of the message. The provided metadata preferably excludes the body or content of the mail message. In one embodiment, the owner of the mailbox may delete the parked message before it is activated and made readable. In such an embodiment, the recipient may remove undesired messages, such as those in a "Parked Bulk Inbox." Also, the sender may be able to delete messages in a parked outbox, and thereby prevent delivery of the message to the intended recipient(s).

Next at a block 150, the email service 112 moves the message to the destination mailbox at the park time. For example, the parked message may be moved from the recipient's "Parked Inbox" to the recipient's "Inbox." The recipient may then view the entire message, including the message body and any multimedia content such as audio, video, or images. In one embodiment, the metadata of a parked message is only available via an online or web email interface. After the message is moved to the recipient's destination mailbox at the end of the park time, the user may process or store the parked message as any other email message, e.g., download the entire message to an email program.

Figure 5:
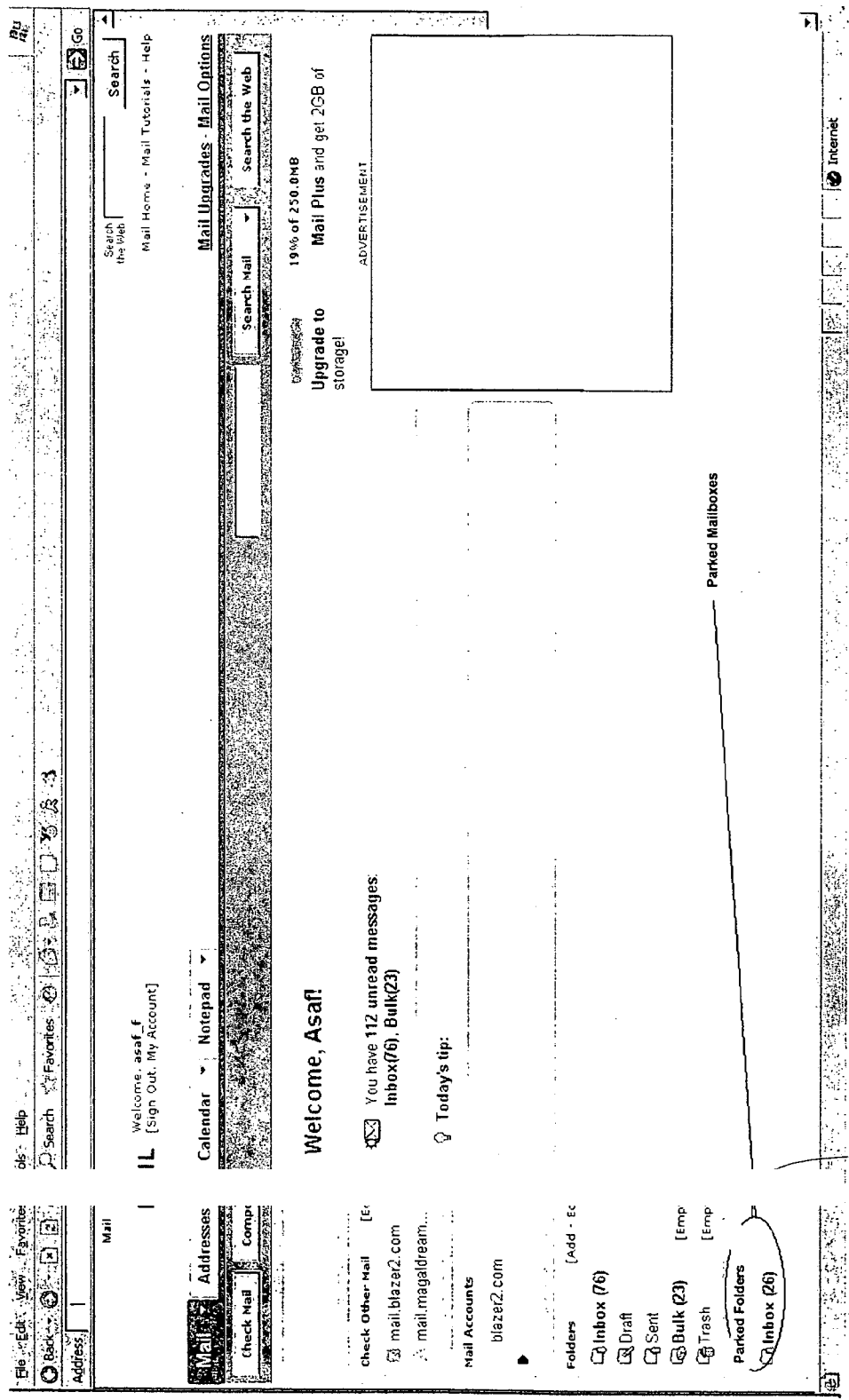
FIG. 5 is a screenshot of an exemplary user interface for viewing email.

FIG. 5 is a screenshot of an exemplary user interface for viewing email using the email system 100. The interface, which may be generated by the web email interface 110, displays icons for the user's mailboxes, including parked mailboxes 501 storing parked messages.

FIG. 6 is a screenshot of an exemplary user interface for viewing parked email messages in a parked mailbox. In particular, the screenshot of FIG. 6 is of a user interface displaying a list of parked email messages in a tabular form. The sender, subject, park time, send time, date, and size are displayed for each of the parked messages in the exemplary "Parked Inbox."

Figure 7:
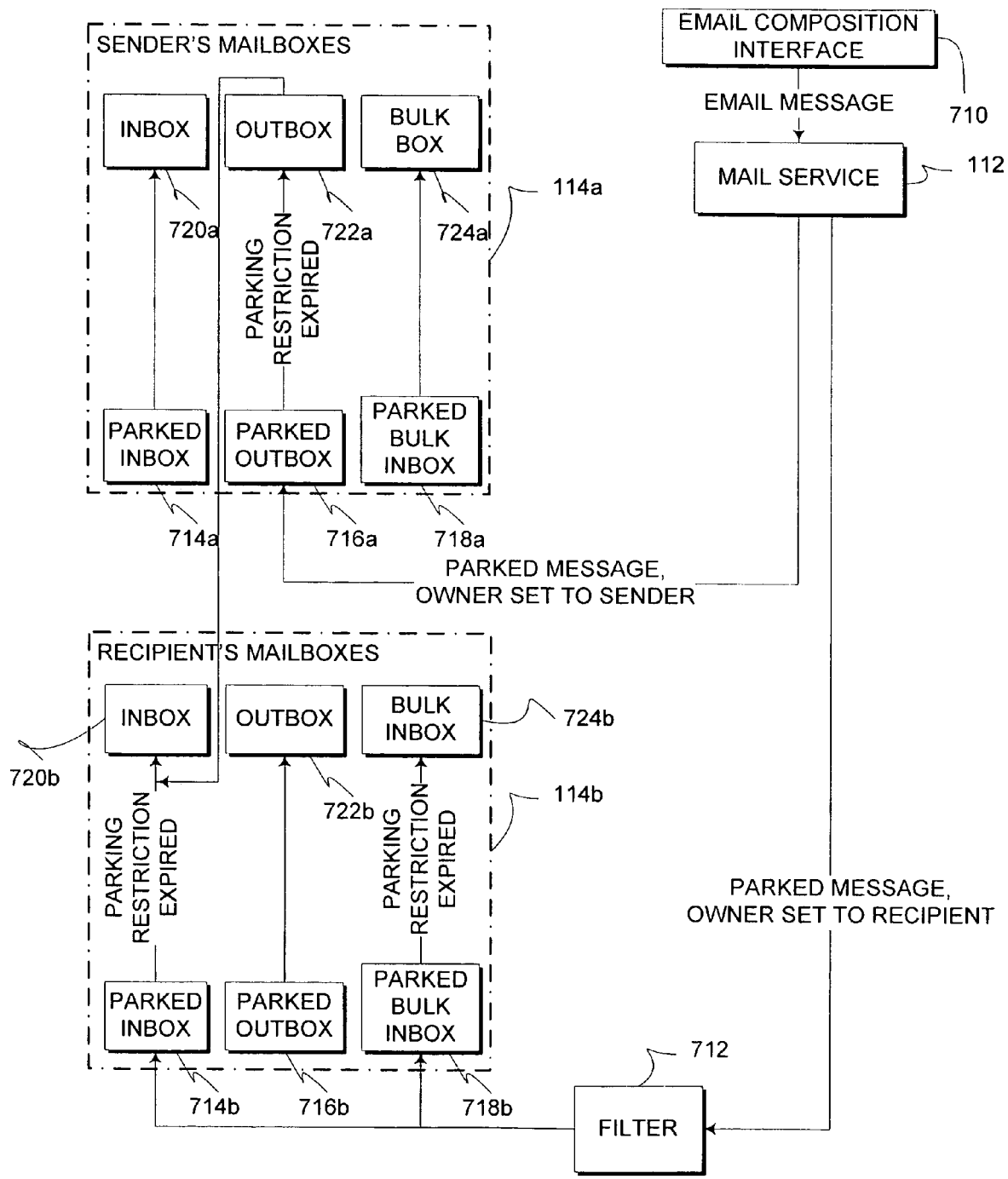
FIG. 7 is a block diagram further illustrating the flow of messages in an email system such as depicted in FIG. 1.

FIG. 7 is a block diagram further illustrating the flow of messages in the exemplary email system 100. In one embodiment, a sender prepares a parked message using an email composition interface 710. In one embodiment, the email composition interface 710 includes the web email interface 110. The parked email message is communicated to the mail service 112. If the sender is designated to store the message, e.g., is the owner, the mail service 112 delivers the message to the sender's mailboxes 114*a*. In one embodiment, the sender's mailboxes include a parked inbox 714*a*, a parked outbox 716*a*, a parked bulk inbox 718*a*, an inbox 720*a*, an outbox 722*a*, and a bulk inbox 724*a*. As discussed above, when a message is in a parked mailbox, the mailbox owner has limited access to the message. For example, in one embodiment, the mailbox owner has read-only access to the message including the message body or content. In the exemplary message flow illustrated in FIG. 7, the mail service 112 delivers the message to the sender's parked outbox 716*a*. At the expiration of the parking restriction, the mail service 112 transfers the parked message from the sender's parked outbox 716*a* to the sender's outbox 722*a*, from where it is sent to the recipient's inbox 720*a*.

For illustration, the sender's outbox 722*a* is shown connected to the recipient's inbox 720*b*, however, in general, such messages pass through the mail service 112. In one embodiment, a message may be communicated from a first mail service 112 associated with the mailboxes 114*a* of the sender to a second mail service 112 associated with the mailboxes 114*b* of the recipient of the messages.

Alternatively, the email message may indicate that the receiver is the owner of the parked message. In one embodiment, the mail service 112 delivers the message first to a filter 712 that determines whether the message is a bulk message to determine which of the recipient's mailboxes 114*b* is to receive the message. In one embodiment, a message may be communicated from a first mail service 112 associated with the mailboxes 114*a* of the sender to a second mail service 112 associated with the mailboxes 114*b* of the recipient of the messages. In one such embodiment, the second mail service 112 includes the filter 712.

If the message is not a bulk message, the filter 712 directs the parked message to the recipient's parked inbox 714*b*. If the message is identified as bulk, the filter 712 directs the message to the recipient's parked bulk inbox 718*b*. Regardless of which of the recipient mailboxes 714*b* or 718*b* that receives the message, the message remains in that mailbox until expiration of the park time. During this period, access to the contents of the parked message may be restricted, as described herein. At the expiration of the park time, in one embodiment, the mail service 112 transfers the parked message to the corresponding mailbox of the user, e.g., a message in the parked inbox 714b is transferred to the recipient's inbox 720b and a message in the parked bulk inbox 718b is transferred to the recipient's bulk inbox 724b.

In one embodiment, the parked mailboxes 714, 716, 718 may be stored separately from the corresponding mailboxes 720, 722, 724. For example, the parked mailboxes may be located in a different file or portion of a file in the mailbox storage 114 than the corresponding non-parked mailboxes. In this embodiment, the storage location of the message data at least partly identifies whether or not a message is parked. Thus, in such an embodiment, the mail service 112 moves or transfers the message from the parked mailbox to the corresponding mailbox after the expiration of the park time.

In another embodiment, the mailbox (parked or non-parked) of a message is determined based on metadata associated with the message. For example, in one embodiment, the stored message data includes a field or flag that indicates whether the message is parked. In this exemplary embodiment, the web mail interface 110 displays the message with reference to an inbox or a parked inbox based on the value of this parked field without copying, or transferring the message data at the expiration of the park time. In this embodiment, the email service 112 updates this field of the message data at the expiration of the park time to identify the message as no longer being parked. In one such an embodiment, the mail service 112 automatically generates the parked mailbox corresponding to a non-parked mailbox (e.g., the parked inbox 714 corresponds to the inbox 720) when a parked message is received (or first received) destined for the corresponding mailbox.

In another embodiment, the message data includes the park time. Thus, in such an embodiment, the mail service 112 may take no action at the expiration of the park time. Rather, in this embodiment, the mail service 112 provides (or excludes) portions of the message data for display by comparing the current time to the park time when the data is provided.

It is to be recognized that while the exemplary system 100 and related methods are described herein with reference to a single email system, in other embodiments, aspects of the functionality described with reference to system 100 may be performed over more than one such email system. For example, in one embodiment, a first email service 112 receives the parked email message from the web interface 110 and communicates the message over the network 104 to a second email service 112. The second email service 112 then processes and stores the message as described above. In one such embodiment, the first email service 112 receives the message from the client and stores the message in a parked mailbox associated with the sender. The first email service 112 then communicates the message over the network to the second email service 112 at the expiration of the park time of the message. In one embodiment, the first email service 112 determines when to communicate the message to the second email service 112 based on the ownership attribute of the message. If the ownership is set to "sender," then the first email service 112 may store the message until expiration of the park time. If the ownership is set to "recipient," the first email service 112 may send the message to the second email server 112 prior to that time, e.g., at the time that the first email service receives the message from the sender.

The email system and methods described above may be used to provide any number of applications. For example, one embodiment is a method of receiving bids via email. In such a method, a party may request the receipt of sealed bids and set a time by which the bids must be received. Bidders wanting to send their bids using conventional email systems would generally want to send their bids well in advance of the set deadline to ensure its delivery. Using the system 100, bidders can send their bids at their convenience prior to the deadline. The receiver is able to view the messages in a parked mailbox without being able to unseal the bids. However, the receiving party is able to monitor the progress of the bidding and determine whether bids are being received.

The system 100 may also be used to send out announcements or advertisements that are intended to be uniformly available the same time. For instance, a business may send email that includes time-sensitive advertisements or coupons for a limited availability product to a large number of recipients. The email may be configured to only be available at a time sufficiently in the future to allow all recipients an equal opportunity to take advantage of the email. Without using the system 100, when the recipient list is large, the amount of time to send the email to all recipients may be sufficiently long that users early in the list of recipients would be able to block later recipients from the opportunity by exhausting available stock.

The system 100 may also be used, for example, by a business to make regulatory announcements that are received at a uniform availability time. A regulator or other party can see that the parked message has been sent prior to this time to ensure compliance with a reporting requirement. Other uses may include games such as people in different locations predicting a future event or the outcome of a sporting contest, a charity sending tickets for a future raffle as part of a fund raising drive, and legal documents such as wills that are sent but that are not immediately available to be viewed. Other uses of the system 100 include sending email to provide additional types of personal communication such as timed personal communications, love letters, or "plane letters," e.g., letters not to be opened until a later time such as when the sender has left on a plane trip.

Another exemplary use is in academic or other settings in which a particular assignment, such as an essay, or other message or attachment must be delivered by a specific time. In such a situation, the student (sender) might want to retain the ability to edit, change, improve, or delete the message up to the last minute.

The sender can send a "parked message" and keep it in their online parked outbox. As long as the sender has access to the system (e.g., via the internet or other access to the email system) the sender can modify the message or delete it completely. However, in the event that the sender does not have access to the internet or to a computer the message is still sent at the specified time unless the sender deletes the message.

The system 100 may also be used to make predictions or wagers regarding future events. In particular, the particular prediction or wager is made in advance by sending a parked message to one or more recipients. Each of the recipients may thus make a wager or prediction prior to the selected time without the other recipients being able to view the others' wagers until after the selected time.

It is to be appreciated that, depending on the embodiment, certain acts or events of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In view of the above, one will appreciate that embodiments of the invention overcome many of the longstanding problems in the art by providing an easy to use and simple way of providing temporal control of email delivery. In particular, embodiments can be implemented in widely available web-based email systems. Moreover, because parked messages may be stored and accessed on independently controlled email systems, e.g., web-based email systems, users can have a reasonable level of confidence in the authenticity of the date time stamp of a parked message and confidence that access to the message body is prevented until the "parking time" expires.

While certain embodiments are described with reference to email systems, other embodiments may include instant messages or short messaging system (SMS) messages. In one embodiment, an instant messaging system may include parked messages as disclosed herein. For example, in one embodiment, an instant messaging server is configured to process parked messages as described herein. In another embodiment, an SMS system, such as used with mobile telephones, may be configured to process marked messages as described herein.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of providing temporal control of electronic message delivery and message availability, comprising:
    receiving message data comprising a message body and only one selected time, the selected time having been received from a sender of said message;
    storing said received message data to a storage area associated with a recipient of the message data prior to the selected time;
    providing for display a first portion of said message data prior to said selected time, said first portion excluding at least a portion of said message body, and said excluded portion being made unavailable for display prior to said selected time; and
    providing for display a second portion of said message data after said selected time, said second portion of said message data comprising said excluded portion of said message body.

2. The method of claim 1, wherein said message data further comprises metadata, said metadata comprising said selected time.

3. The method of claim 2, wherein said second portion comprises at least one of a message subject, metadata, and the selected time.

4. The method of claim 1, further comprising:
    displaying said first portion of said message data to a recipient prior to said selected time; and
    displaying said second portion of said message data to a recipient after said selected time.

5. The method of claim 1, wherein said message comprises at least one of an email message, an instant message, or a short message system (SMS) message.

6. The method of claim 1, wherein said storage area associated with the recipient comprises a first and second mailbox, and said method further comprising:
    visually relating said message with the first mailbox prior to said selected time;
    visually relating said message with the second mailbox after said selected time.

7. The method of claim 6 further comprising automatically generating said first mailbox to correspond to said second mailbox.

8. The method of claim 1, wherein providing said first portion of said message data comprises displaying at least the sender, a recipient, the send time, and subject of said message.

9. The method of claim 1, wherein said providing said first portion of said message data comprises providing said first portion of said message data to a recipient of said message.

10. The method of claim 1, wherein said message body comprises data indicative of at least one of a bid, a birthday greeting, academic material, marketing or promotional material, a personal message, a prediction, and a wager, wherein said data is associated with the selected time.

11. The method of claim 1, wherein the selected time comprises at least one of a date, a time of day, or an offset extending from the time and date that said message was sent by the sender.

12. The method of claim 1, wherein the step of providing for display a first portion of said message occurs at a time that is prior to but otherwise substantially independent of the selected time.

13. A system for providing temporal control of electronic message delivery, comprising:
    a storage configured to store message data related to a message, said message data comprising a message body and only one selected time, said selected time having been received from a sender of said message; and
    at least one processor configured to:
        store said message data to a portion of said storage associated with a recipient of the message prior to the selected time;
        prior to said selected time, provide a first portion of said message data, said first portion excluding at least a portion of said message body, wherein said processor makes said excluded portion unavailable prior to said selected time; and
        after said selected time, provide a second portion of said message data, said second portion of said message data comprising said excluded portion of said message body.

14. The system of claim 13, wherein the selected time comprises at least one of a date, a time of day, or an offset extending from the time and date that said message was sent by the sender.

15. The system of claim 13, wherein said processor is configured to provide said message data via a web interface.

16. The system of claim 13, wherein said portion of said storage associated with the recipient of the message comprises a first mailbox and a second mailbox, and wherein said processor is further configured to:
    identify said message with the first mailbox prior to said selected time; and
    identify said message with the second mailbox after said selected time.

17. The system of claim 13, wherein said processor is further configured to:
    display said first portion of said message data prior to said selected time; and
    display said second portion of said message data after said selected time.

18. The system of claim 13, wherein said message comprises at least one of an email message, an instant message, or a short message system (SMS) message.

19. The system of claim 13, wherein said storage comprises at least one restricted area configured to provide for display at least a message subject, a sender, and said selected time and at least one unrestricted storage area configured to provide a recipient of the message with unrestricted access to said message data.

20. The system of claim 19, wherein said processor is configured to store said message data in said restricted area prior to said selected time and to transfer said message data to said unrestricted area after said selected time.

21. A system for providing temporal control of electronic message delivery, comprising:
- means for storing message data related to a message to a storage area associated with a recipient of the message, said message data comprising a message body and only one selected time, said selected time having been received from a sender of said message, wherein said means for storing message data is configured to receive said message data prior to said selected time;
- means for providing for display a first portion of said message data prior to said selected time, said first portion excluding at least a portion of said message body, wherein said means for providing is further configured to make said excluded portion unavailable for display prior to said selected time; and
- means for providing for display a second portion of said message data after said selected time, said second portion of said message data comprising said excluded portion of said message body.

22. The system of claim 21, further comprising:
- means for visually relating said message with a first mailbox prior to said selected time; and
- means for visually relating said message with a second mailbox after said selected time.

23. The system of claim 21, further comprising:
- means for displaying said first portion of said message data prior to said selected time; and
- means for displaying said second portion of said message data after said selected time.

24. The system of claim 21, wherein said message comprises at least one of an email message, an instant message, or a short message system (SMS) message.

25. The system of claim 21, wherein said providing means comprises an email server.

* * * * *